US012337323B2

(12) United States Patent
Guy

(10) Patent No.: US 12,337,323 B2
(45) Date of Patent: Jun. 24, 2025

(54) CLOSURE ELEMENT FOR A MICROPLATE WELL HAVING VENTS AND A SLOT, AND METHOD FOR THE USE THEREOF

(71) Applicant: BIOMÉRIEUX, Marcy l'Etoile (FR)

(72) Inventor: Michel Guy, Grenoble (FR)

(73) Assignee: BIOMÉRIEUX, Marcy l'Etoile (FR)

( * ) Notice: Subject to any disclaimer, the term of this patent is extended or adjusted under 35 U.S.C. 154(b) by 788 days.

(21) Appl. No.: 17/594,620

(22) PCT Filed: Apr. 29, 2020

(86) PCT No.: PCT/FR2020/050724
§ 371 (c)(1),
(2) Date: Oct. 25, 2021

(87) PCT Pub. No.: WO2020/225502
PCT Pub. Date: Nov. 12, 2020

(65) Prior Publication Data
US 2022/0193664 A1 Jun. 23, 2022

(30) Foreign Application Priority Data
May 3, 2019 (FR) ..................................... 19 04688

(51) Int. Cl.
*B01L 3/00* (2006.01)

(52) U.S. Cl.
CPC ... *B01L 3/50825* (2013.01); *B01L 2200/0689* (2013.01); *B01L 2200/16* (2013.01); *B01L 2300/042* (2013.01); *B01L 2300/0832* (2013.01)

(58) Field of Classification Search
CPC ......... B01L 3/50825; B01L 2200/0689; B01L 2200/16; B01L 2300/042; B01L 2300/0832
See application file for complete search history.

(56) References Cited

U.S. PATENT DOCUMENTS 4,193,402 A 3/1980 Rumpler
4,515,752 A * 5/1985 Miramanda ............ B65D 51/00 422/547
4,915,243 A 4/1990 Tatsumi et al.
6,068,150 A 5/2000 Mitchell et al.
6,500,390 B1 12/2002 Boulton et al.
2004/0026353 A1* 2/2004 Collins ............... B01L 3/50825 215/355
2019/0062010 A1 2/2019 Apte et al.

FOREIGN PATENT DOCUMENTS

WO 2015/059254 A1 4/2015

OTHER PUBLICATIONS

International Search Report, dated Oct. 29, 2020, corresponding to PCT/FR2020/050724.

* cited by examiner

*Primary Examiner* — Jill A Warden
*Assistant Examiner* — Michael Stanley Gzybowski
(74) *Attorney, Agent, or Firm* — Oliff PLC

(57) ABSTRACT

An obturation element (1) for a well receiving a chemical or biological solution to be analyzed, including for each well, a plug (4) including an insertion sleeve (5) in the form of a cylinder provided with two truncated areas (15) arranged in a symmetrically opposite manner on the outside of the sleeve to form vents, this insertion sleeve (5) being provided with a bottom wall (9) in which a through-cutout (18) is arranged, oriented radially in the direction of the two truncated areas (15).

16 Claims, 4 Drawing Sheets

[Fig. 1]
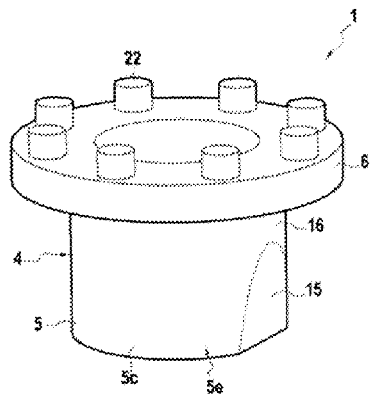
[Fig. 2]
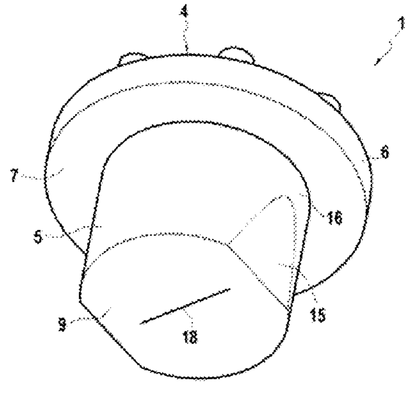

[Fig. 3]
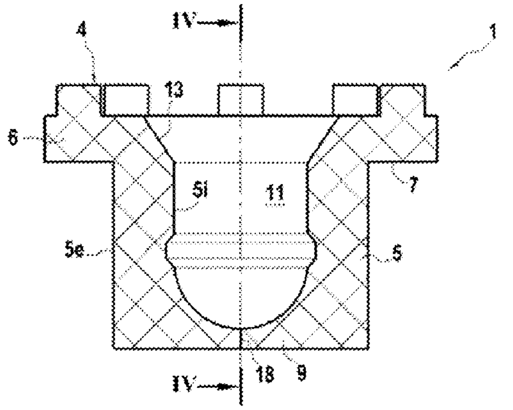
[Fig. 4]
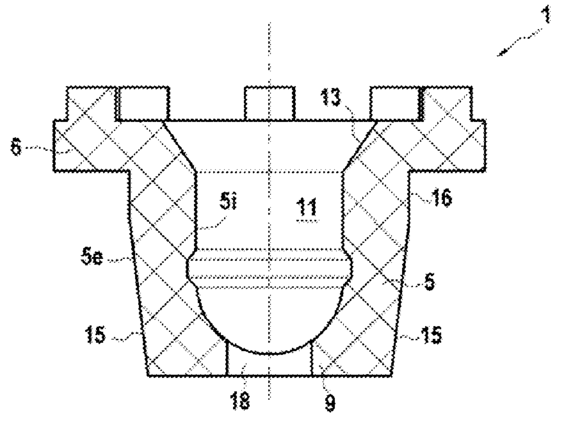

[Fig. 5]
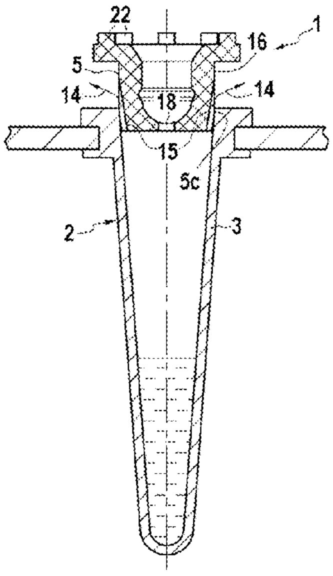
[Fig. 6]
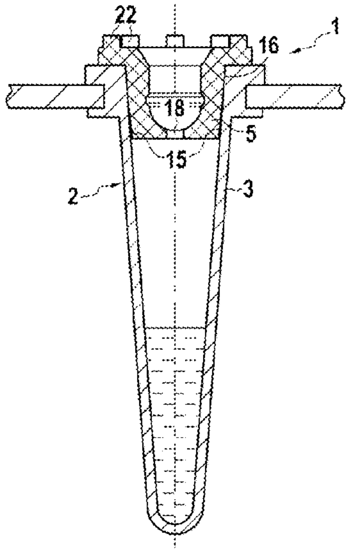

[Fig. 7]
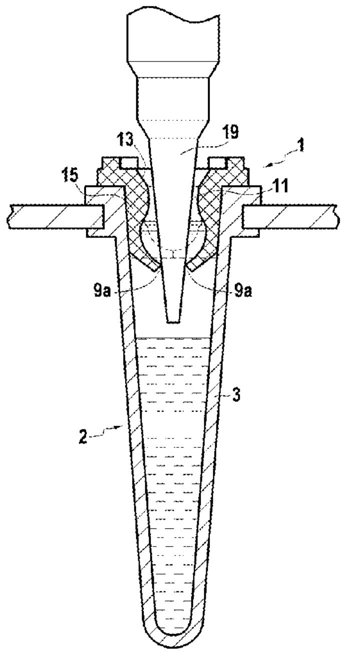
[Fig. 8]
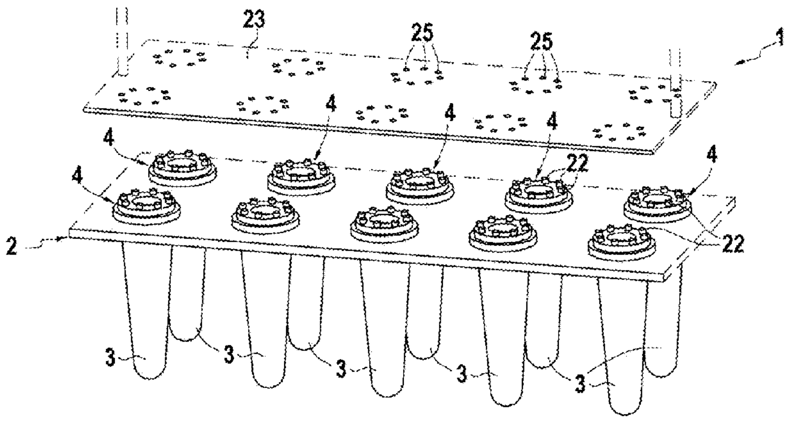

CLOSURE ELEMENT FOR A MICROPLATE WELL HAVING VENTS AND A SLOT, AND METHOD FOR THE USE THEREOF

TECHNICAL FIELD

The object of the invention relates to the technical field of the handling of the fluid samples in chemical or biological processes in the general sense and it relates more specifically to the field of diagnostic kits for a chemical or biological solution to be analyzed.

PRIOR ART

U.S. Pat. No. 6,500,390 relates to the technical field of microplates intended to receive and prevent the loss of fluid samples during the different treatment steps. This microplate includes containers each fitted with a plug adapted to contain the liquid sample inside the container, regardless of the position of the microplate. Each plug is also provided with a central opening forming a vent to allow communicating the containers with the outside. By the presence of the vents, such a microplate does not allow guaranteeing complete sealing, which constitutes a risk of contamination of the liquid samples.

Patent application WO 2015/059254 describes a lysis kit and a method for preparing a sample such as, for example, a sample of biological material to be analyzed. This kit includes a tube intended to contain beads facilitating the lysis and a lysis buffer solution. An elastically deformable cap is mounted at the open end of the tube to hermetically close it. This cap includes a slot allowing the passage of the tip of a pipette which allows the introduction of a sample of biological material and the aspiration of the lysate obtained. Such a kit is not adapted to allow particularly a lyophilization operation which requires communicating the tube with the outside for the discharge of the water. The withdrawal of the cap is conducive to contamination of the sample of material contained in the container or of the work environment. The cap itself deposited on the working plane can be a source of contamination. Furthermore, the expulsion of the sample is commonly observed when caps on small containers are withdrawn. Finally, the operations of placing and withdrawing caps are constraints for the operators given the number of analyzes they must perform.

Patent FR 2 416 848 describes a plug for medication, particularly for products intended to be subjected to a treatment such as lyophilization. This plug includes a sleeve intended to be inserted into a well by elastic deformation. This sleeve is provided from its free end with an opening forming a vent when the plug occupies a partial depressed position in the well. This sleeve is surmounted by a head cooperating with the well to ensure its sealed closing when the plug is fully depressed into the well. For use of the product, the plug is pierced with a hollow needle. In practice, such a plug is difficult to penetrate by relatively blunt tips such as pipette tips made of disposable plastic or pipette tips made of single-use flexible plastic.

The present invention aims to overcome the drawbacks of the prior art by proposing an obturation element for a well receiving a chemical or biological solution to be analyzed, compatible with the implementation on the one hand of an operation requiring a communication with the outside such as a lyophilization operation and on the other hand of a sealed storage operation, this obturation element furthermore allowing quick and reliable access to the contents of the receiving well using a plastic pipette.

DISCLOSURE OF THE INVENTION

To achieve such an objective, the invention relates to an obturation element for a well receiving a chemical or biological solution to be analyzed, including for each well, a plug including a sleeve to be inserted into the well by elastic deformation, this insertion sleeve delimiting from the free end of the sleeve, at least one vent when the plug occupies a partial depressed position, the plug including a sealed portion positioned such that in a more depressed position of the plug, relative to the partial depressed position, this portion cooperates with the well to ensure its sealed closing.

According to the invention, the insertion sleeve is in the form of a cylinder provided with two truncated areas arranged in a symmetrically opposite manner on the outside of the sleeve to form vents, this insertion sleeve being provided with a bottom wall in which a through-cutout is arranged, oriented radially in the direction of the two truncated areas, this cutout extending between two passage faces of the bottom wall, in contact against each other to ensure a sealing and authorize by elastic deformation, the passage of a tip of a pipette.

In addition, the obturation element according to the invention may further include in combination at least either of the following additional characteristics:

- the cutout is made without removal of material;
- each truncated area extends over an angular range of the sleeve, with the cutout extending along a direction intersecting each of the truncated areas substantially in its middle;
- each truncated area extends over an angular range of the insertion sleeve of between 40° and 160°;
- the two truncated areas serving as vents are flat sections arranged from the free end of the insertion sleeve and in a diametrically opposite manner in the extension of the cutout;
- the truncated areas leave therebetween, an area of the sleeve having an outer diameter greater than the diameter of the well to ensure, when the plug occupies its closed position of the well, a deformation of the sleeve orienting the mechanical stresses along a direction substantially perpendicular to the cutout tending to bear the passage faces against each other;
- the sealed portion is a portion of the insertion sleeve overhanging the truncated areas;
- the sealed portion is a cylindrical head connected to the insertion sleeve by a shoulder cooperating in a sealed manner with the edge of the well;
- each plug has an inner cavity delimited by the inside of the insertion sleeve and opening at the cylindrical head, by a guide chamfer for the tip of the pipette;
- each plug is provided with a removable system for fastening to a support sheet from which the insertion sleeves of a series of plugs protrude.

Another object of the invention is to propose a kit for a chemical or biological solution to be analyzed, including a container equipped with at least one well each receiving a reagent, a plug of an obturation element ensuring the closing of each well.

According to one advantageous characteristic of the kit, the truncated areas of the plug leave therebetween an area of the sleeve having an outer diameter greater than the diameter of the well to ensure, when the plug occupies its closed position of the well, a deformation of the sleeve orienting the mechanical stresses along a direction substantially perpendicular to the cutout tending to bear the passage faces against each other.

Another object of the invention is to propose a method for using a kit for a chemical or biological solution to be analyzed, including a container equipped with at least one well, the method consisting in:

pre-filling each well with an aqueous reagent;

prior to a treatment step, placing in each well, in its partial depressed position, a plug of an obturation element in accordance with the invention;

carrying out the treatment step during which a gaseous medium is discharged from each well through the vents of the plugs;

and lowering each plug to ensure the sealed closing of each well after the treatment operation.

Advantageously, the treatment step is a lyophilization step.

According to one variant, the method, after the sealed closing by a plug of each well after the treatment operation, consists in:

introducing the tip of an aqueous solution injection pipette into the cutout of each plug;

delivering the aqueous solution into the well using the pipette;

withdrawing the tip of the pipette from each plug;

and ensuring an amplification operation before a detection operation.

Advantageously, the amplification operation is preceded by a centrifugation operation.

According to one characteristic of the invention, the aqueous solution contains a chemical or biological sample to be analyzed.

According to another characteristic of the invention, the plugs are withdrawn to be replaced by an optical plug prior to an amplification operation preceding a detection operation.

Various other characteristics emerge from the description given below with reference to the appended drawings which show, by way of non-limiting examples, embodiments of the object of the invention.

BRIEF DESCRIPTION OF THE DRAWINGS

FIG. 1 is a perspective view of an exemplary embodiment of the obturation element in accordance with the invention.

FIG. 2 is a perspective bottom view showing the slot of the obturation element in accordance with the invention.

FIG. 3 is a sectional view of the obturation element in accordance with the invention, taken along a plane perpendicular to the slot.

FIG. 4 is a sectional view of the obturation element in accordance with the invention, taken along the lines IV-IV of FIG. 3.

FIG. 5 shows an obturation element in accordance with the invention, partially engaged inside a well.

FIG. 6 shows an obturation element in accordance with the invention, fully engaged inside a well.

FIG. 7 is a sectional view of an obturation element taken perpendicularly to the direction of the slot in the plug and showing the tip of a pipette engaged through the slot of an obturation element in accordance with the invention, mounted inside a well.

FIG. 8 is a partial view of a kit including a support plate of several wells fitted with plugs of an obturation element in accordance with the invention, capable of being held together by a support sheet.

DESCRIPTION OF THE EMBODIMENTS

As emerges more specifically from the Figures, the object of the invention relates to an obturation element 1 intended to be used with a container 2 receiving a chemical or biological solution to be analyzed. According to one preferred application illustrated in FIG. 8, the container 2 is in the form of a microplate having a series of wells 3 each intended to receive a chemical or biological solution to be analyzed. The obturation element 1 includes, for each well 3, a plug 4 in accordance with the invention which is illustrated more specifically in FIGS. 1 to 4.

Each plug 4 includes an insertion sleeve 5 intended to be engaged in a well 3 by elastic deformation. This insertion sleeve 5 is in a tubular form or in the form of a cylinder of circular section whose diameter is adapted to the diameter of the well 3 to ensure the sealed mounting and by elastic deformation of the plug inside the well. The insertion sleeve 5 thus has an outer face **5*e* and an inner face 5*i***.

The insertion sleeve 5 is connected to a cylindrical head 6 via a shoulder 7 forming a sealed portion intended, in the complete depressed position of the plug, to cooperate with the edge of the well 3.

This insertion sleeve 5 is provided opposite the head 6, with a bottom wall 9. The plug 4 thus has an inner cavity 11 delimited by the inside of the sleeve 5 and more specifically by the inner face **5*i*. This inner cavity 11 is open at the cylindrical head 6 and closed by the bottom wall 9. In the example illustrated, the bottom wall 9 is arranged at the free end of the insertion sleeve 5 but it should be noted that the bottom wall 9 can extend recessed from the free end of the insertion sleeve 5**.

According to one advantageous characteristic of embodiment, the inner cavity 11 opens at the cylindrical head 6, by a chamfer 13 which, as will be explained in the remainder of the description, serves as a guide for the tip of a pipette.

According to one characteristic of the invention, the insertion sleeve 5 delimits from the free end of the sleeve, two vents 14 when the plug occupies a partial depressed position as illustrated in FIG. 5. To this end, the insertion sleeve 5 is provided with two truncated areas 15 arranged in a symmetrically opposite manner on the outside of the insertion sleeve 5 and from the free end of the insertion sleeve. As appears more specifically in FIGS. 1, 2 and 4, each truncated area 15 is a flat section arranged on the outer face **5*e* of the insertion sleeve 5 such that the insertion sleeve has externally a frustoconical profile at the locations of the flat sections. Each flat section 15 corresponds to a removal of material whose thickness removed in the illustrated example gradually decreases from the free end of the insertion sleeve. Each flat section 15 is arranged from the free end of the insertion sleeve 5 by extending along a determined height of the insertion sleeve to stop recessed from the head 6 so as to leave a sealed portion 16. The insertion sleeve 5 thus has a sealed portion 16 which has a circular section overhanging the flat sections 15. It should be understood that each truncated area 15 corresponds to a removal of material made on the outer face 5*e* of the insertion sleeve 5 such that the section of the insertion sleeve 5 passing through these truncated areas is a symmetrically truncated circular section, smaller than the circular section of the sealed portion 16**.

It should be understood that when this sealed portion 16 cooperates with the well 3, the plug 4 ensures the sealed closing of the well 3. When the sealed portion 16 cooperates with the well 3, the plug 4 is more depressed than in the partial depressed position for which the vents 14 ensure a communication with the outside. The sealed closing of the well 3 by the plug 4 is obtained either for a partial depressed position for which the sealed portion 16 cooperates with the well 3 or fora complete depressed position for which this sealed portion 16 cooperates with the well and the head 6 by its shoulder 7 is sealingly bearing on the edge of the well 3.

It should be understood that each flat section 15 extends over a limited angular range of the insertion sleeve so as to leave therebetween two contact areas 5*c* delimited by the outer face 5*e*. In the partial depressed position (FIG. 5), the plug 4 cooperates with the well 3 by these contact areas 5*c*, holding in position the plug inside the well. Advantageously, each truncated area 15 extends over an angular range of the insertion sleeve 5 of between 40° and 160°, this angular range being taken at the free end of the insertion sleeve 5.

In accordance with another characteristic of the invention, the bottom wall 9 includes a through-cutout 18 which passes right through the bottom wall 9 by extending between two passage faces 9*a* of the bottom wall. This cutout 18 thus communicates with the inner cavity 11 and with the environment delimited by the outer face of the bottom wall 9. According to one advantageous characteristic of embodiment, this cutout 18 is made without removal of material using for example a cutting tool. This cutout 18 is rectilinear in a dimension adapted to authorize the passage, by elastic deformation of the passage faces 9*a*, of a pipette tip 19 (FIG. 7). This cutout is arranged diametrically or radially relative to the insertion sleeve 5.

According to one characteristic of the invention, this cutout 18 is oriented radially or diametrically in the direction of the two truncated areas 15. Thus, the cutout 18 extends along a direction which intersects each of the truncated areas 15. Advantageously, the cutout 18 has a direction which intersects each of the truncated areas 15 substantially in its middle. According to one preferred variant, the cutout 18 does not extend to the flat sections 15. In other words, the cutout 18 does not lead to the outer face 5*e* of the sleeve 5. This cutout 18 authorizes by elastic deformation the passage of the tip 19 of a pipette and ensures, in the absence of the tip 19 of the pipette, a sealing by the two passage faces 9*a* of the bottom wall in contact with each other. It should be noted that when the plug 4 occupies its closed position of the well, the insertion sleeve 5 is deformed by orienting the mechanical stresses along a direction substantially perpendicular to the cutout 18 tending to bear the passage faces 9*a* against each other, due to the orientation of the cutout 18 in the direction of the flat sections 15 and to the presence of these flat sections. The presence of the flat sections 15 avoids creating mechanical stresses due to the compression of the insertion sleeve 5 directed along the axis of the cutout 18 which would tend to open this cutout.

The contact areas 5*c* defined between the flat sections 15 have an outer diameter adapted to the diameter of the well 3 to ensure elastic deformation of the insertion sleeve ensuring the sealed mounting of the plug. Typically, the diameter of the insertion sleeve 5 is greater than the diameter of the well 3. It follows that this deformation of the insertion sleeve 5 causes the bearing of the passage faces 9*a* of the cutout which is thus hermetically closed.

According to one advantageous characteristic of embodiment, each plug 4 is provided with a removable system for fastening 22 to a support sheet 23. In the example illustrated in FIG. 8, each plug 4 includes, as a removable fastening system 22, studs or lugs arranged on the cylindrical head 6 of the plug and intended to cooperate with housings 25 arranged on the support sheet 23. Of course, the shapes of the studs 22 and of the housings 25 are congruent and the dimensions of the studs 22 and of the housings 25 are adapted to obtain an interlocking by elastic deformation during the insertion of each stud 22 in a complementary housing 25. In the mounted position of the plugs 4 on the support sheet 23, the insertion sleeves 5 of the plugs 4 protrude from the support sheet 23. The obturation element 1 according to the invention thus includes a series of plugs 4 connected to each other by the support sheet 23 allowing simultaneous handling of the series of plugs 4. The plugs 4 can thus be engaged simultaneously in the wells 3 of a microplate. Likewise, the plugs 4 can be detached from the support sheet 23 while remaining inserted into the wells 3 during the application of a lifting force on the support sheet 23.

Of course, each plug 4 can be provided with a removable system for fastening 22 to a support sheet 23, different from the one illustrated by way of example in FIG. 8. For example, each plug 4 can be equipped at its head 6 with a peripheral groove in which the edge of an opening arranged in the support sheet 23 engages.

The implementation of the obturation element 1 in accordance with the invention follows directly from the preceding description. The obturation element 1 includes one or more plugs 4 each intended to equip a well 3 of a container 2, for example in the form of a microplate. The method for using this obturation element 1 with a microplate 2 consists in implementing the following steps:

- pre-filling each well 3 with an aqueous reagent in the general sense. By reagent it is meant any substance implemented for the preparation of the chemical or biological solution to be analyzed. In the case of a sample of biological material to be analyzed, the reagents are PCR mix reagents (enzymes, nucleotides and other components necessary for the amplification);
- fitting each well 3 with a plug 4 in accordance with the invention in a partial depressed position in which the plug 4 delimits with the well 3, two vents 14. As illustrated in FIG. 5, the plug 4 is held in a stable position inside the well 3 by the contact areas 5*c* of the insertion sleeve 5. The flat sections 15 of the insertion sleeve 5 authorizing the communication through the vents 14, between the interior of well 3 and the external environment;
- carrying out a step of treating the contents of each well 3, during which a gaseous medium is discharged from each well 3 through the vents 14 of the plugs 4. Typically, such a treatment operation can be a lyophilization operation of the contents of the well 3. In a preferred exemplary embodiment, each well 3 is pre-filled with aqueous PCR reagents;
- lowering each plug 4 to ensure the sealed closing of each well 3 after the treatment operation. Typically, in the closed position illustrated in FIG. 6, the cylindrical head 6 of each plug 4 bears on the edge of the well 3. In this complete obturated position, each plug 4 sealingly obturates the well 3 by the cylindrical head 6 and the sealed portion 16 of the sleeve overhanging the truncated areas 15. Furthermore, as explained above, in this inserted position of the sleeve 5 inside the well 3, the cutout 18 is hermetically closed by the passage faces 9*a* bearing against each other, undergoing the mechanical stresses tending to close the cutout.

It is thus possible to have a kit for a chemical or biological solution to be analyzed, including a container 2 equipped with at least one well 3 each receiving a reagent, a plug 4 of an obturation element 1 in accordance with the invention ensuring the closing of each well 3.

Such a kit can be used to allow the continuation of a use method aimed at ensuring the analysis of an aqueous chemical or biological solution and advantageously, a sample of biological material. The method consists in introducing the tip 19 of a pipette to allow the injection of an aqueous solution through the cutout 18 of each plug 4. Typically, this aqueous solution is a biological sample to be analyzed. This aqueous solution or biological sample is also used for rehydration of the reagent contained in the well, and particularly of the PCR mix reagents.

After the injection of this aqueous solution, the tip 19 of the pipette is withdrawn from each plug 4 before carrying out an amplification operation which may occur before a detection operation. The possibility of keeping the same plug throughout the method is particularly advantageous for the operators given the number of analyzes to be carried out. Keeping such a plug with a slot goes against the habits of the operators in molecular biology.

It should be noted that the amplification operation may be preceded by a centrifugation operation. The centrifugation is necessary to properly mix the lyophilized reagents and the aqueous solution and to bring the whole to the bottom of the container. By bringing the mixture to the bottom of the container, the centrifugation allows the plug to be clean and prevent contamination. This operation also allows not having the formation of bubbles. It should be noted that the plugs 4 of the kit can be replaced by optical plugs prior to an amplification operation preceding a detection operation.

The invention is not limited to the examples described and represented because various modifications can be made without departing from its scope.

The invention claimed is:

1. An obturation element for a well receiving a chemical or biological solution to be analyzed, comprising:

a plug having an elastically deformable sleeve that is insertable into the well, wherein the sleeve delimits, from a free end of the sleeve, at least one vent when the plug is in a partially depressed position in the well, wherein the plug comprises a sealing portion positioned such that, in a more depressed position of the plug, relative to the partially depressed position, the sealing portion cooperates with the well to ensure a sealed closing, wherein the sleeve is in the form of a cylinder provided with two truncated areas arranged in a symmetrically opposite manner on the outside of the sleeve to form vents, wherein the sleeve comprises a bottom wall having a cutout that extends radially between the two truncated areas, wherein the cutout extends between two passage faces of the bottom wall, in contact against each other.

2. The obturation element according to claim 1, wherein the cutout is made without removal of material.

3. The obturation element according to claim 1, wherein each truncated area extends over an angular range of the sleeve, with the cutout extending along a direction intersecting each of the two truncated areas.

4. The obturation element according to claim 1, wherein each of the two truncated areas extends over an angular range of the sleeve of between 40° and 160°.

5. The obturation element according to claim 1, wherein the two truncated areas serving as vents are flat sections arranged from the free end of the sleeve, and in a diametrically opposite manner in an extension of the cutout.

6. The obturation element according to claim 1, wherein the sleeve comprises a sealing portion that overhangs the truncated areas.

7. The obturation element according to claim 1, wherein the plug comprises a system for fastening to a support sheet, from which sleeves of a series of plugs protrude.

8. The obturation element according to claim 1, wherein the sealing portion is a cylindrical head connected to the sleeve by a shoulder cooperating in a sealed manner with an edge of the well.

9. The obturation element according to claim 8, wherein the plug has an inner cavity delimited by the inside of the sleeve and opening at the cylindrical head by a guide chamfer for the tip of the pipette.

10. A kit for a chemical or biological solution to be analyzed, comprising:

a container comprising at least one well for receiving a reagent, and the plug of an the obturation element according to claim 1.

11. The kit according to claim 10, wherein the truncated areas of the plug leave therebetween an area of the sleeve having an outer diameter greater a diameter of the well to ensure, when the plug occupies its closed position of the well, a deformation of the sleeve orienting the mechanical stresses along a direction substantially perpendicular to the cutout, tending to bear the two passage faces against each other.

12. A method for using a kit according to claim 10 for a chemical or biological solution to be analyzed the method comprising:

pre-filling the well with an aqueous reagent;

prior to a treatment step, inserting the plug of the obturation element into the well, until the plug is in a partially depressed position;

carrying out the treatment step during which a gaseous medium is discharged from the well through the vents; and lowering the plug into the well after the treatment step, to ensure a sealed closing of the well.

13. The method according to claim 12, wherein the treatment step is a lyophilization step.

14. The method according to claim 12, wherein, after the lowering step, the method further comprises:

introducing the tip of an aqueous solution injection pipette into the cutout of the plug;

delivering the aqueous solution into the well using the pipette;

withdrawing the tip of the pipette from the plug; and carrying out an amplification operation before a detection operation.

15. The method according to claim 14, wherein the amplification operation is preceded by a centrifugation operation.

16. The method according to claim 14, wherein the aqueous solution comprises a chemical or biological sample to be analyzed.

* * * * *